Sheet 2-2 Sheets.

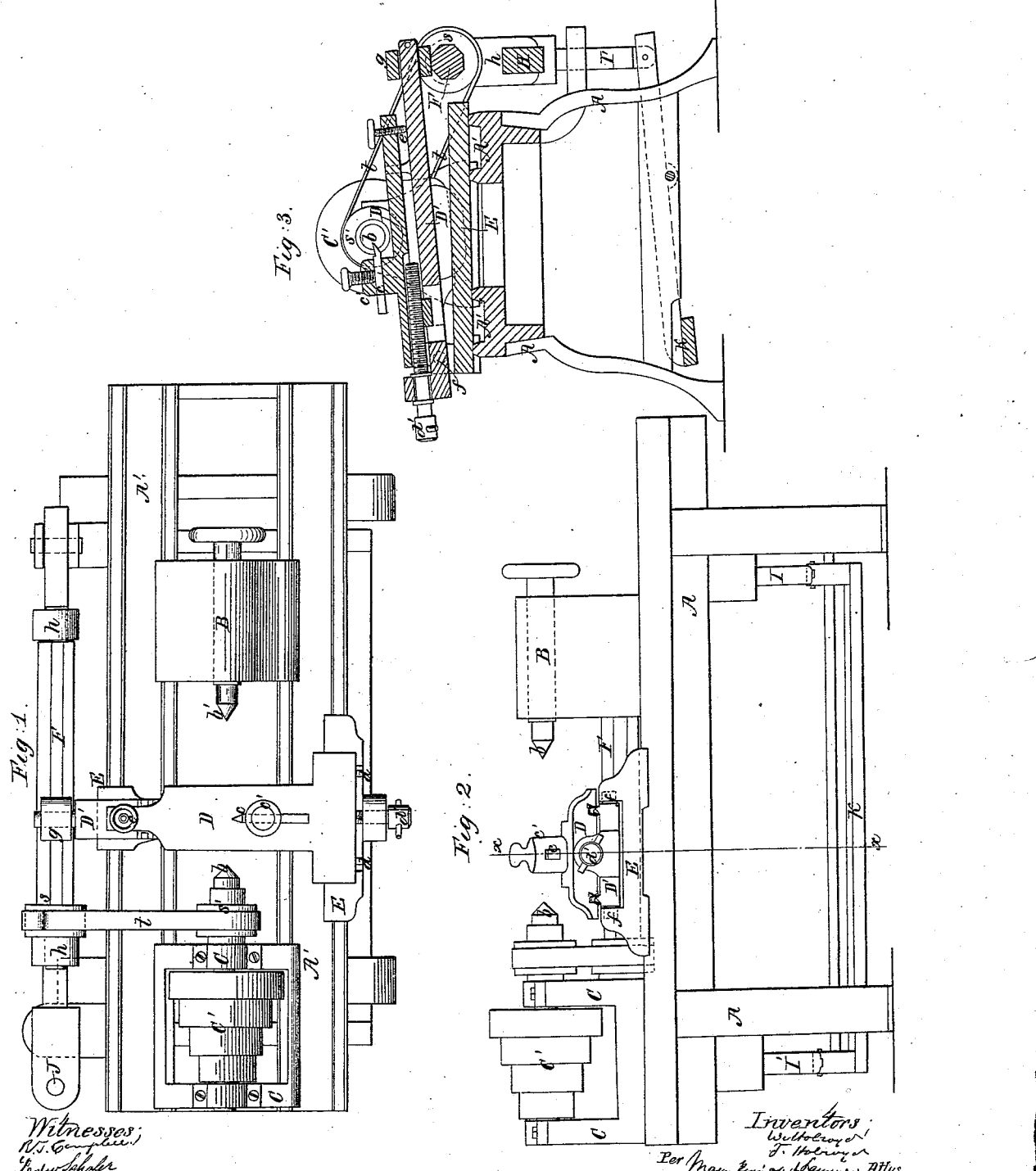

W. & J. Holroyd,
Screw-Threading Machine,
Nº 64,420. Patented May. 7, 1867.

Witnesses:

Inventors:

UNITED STATES PATENT OFFICE.

WILLIAM AND JAMES HOLROYD, OF WATERFORD, NEW YORK.

IMPROVEMENT IN MACHINES FOR CUTTING SCREW-TAPS.

Specification forming part of Letters Patent No. 64,420, dated May 7, 1867.

*To all whom it may concern:*

Be it known that we, WILLIAM HOLROYD and JAMES HOLROYD, of Waterford, Saratoga county, State of New York, have invented a new and improved Machine for Cutting Screw-Taps; and we do hereby declare that the following is a full, clear, and exact description thereof, reference being had to the accompanying drawings, making part of this specification, in which—

Figure 1, sheet 1, is a top view of the machine.

Figure 2 is a front elevation.

Figure 3 is a transverse section taken in the vertical plane indicated by red line $x\,x$ in fig. 2.

Figure 6:
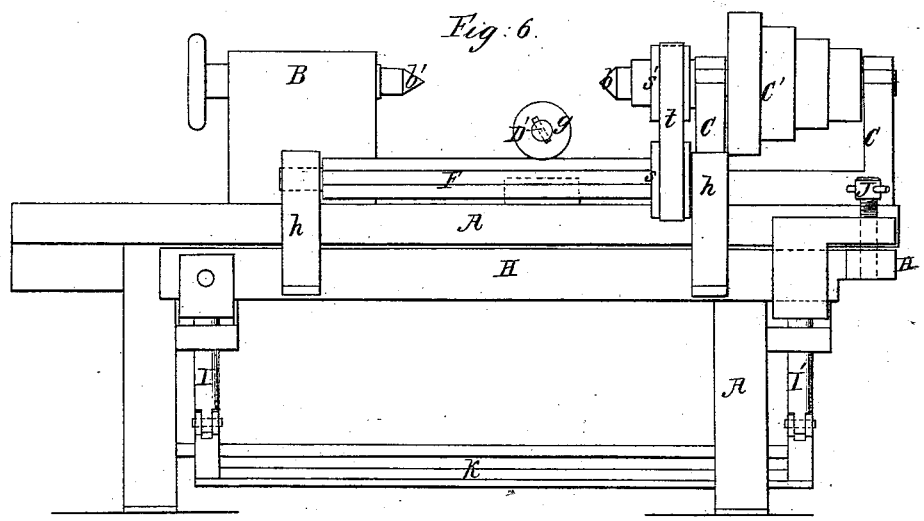

Figure 6, sheet 2, is an elevation of the back part of the machine.

Figure 7:
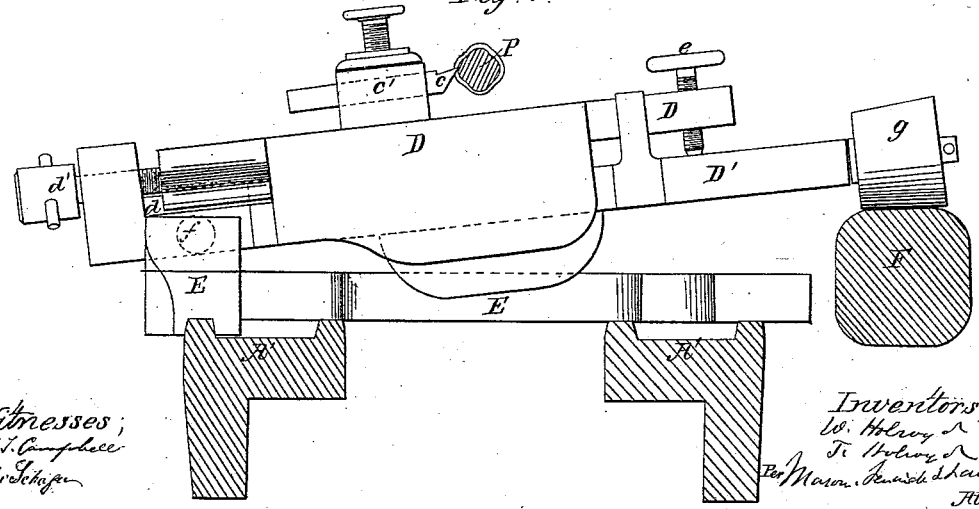

Figure 7 is an enlarged view in detail of the tool-holder, rotary pattern, and blank tap.

Similar letters of reference indicate corresponding parts in the several figures.

This invention relates to certain novel improvements on machinery which is designed for producing screw-taps for cutting threads in nuts and other objects, as will be hereinafter described.

To enable others skilled in the art to understand our invention, we will proceed to describe its construction and operation.

Figure 4:
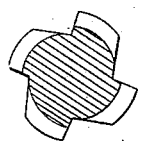
Figures 4 and 5 are sections of a finished screw-tap having eccentric screw-threads.
Figure 5:
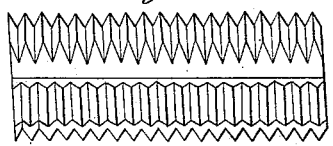

In the accompanying drawings A represents the frame of the lathe, A' the bed, upon which the head-stock B and tool-rest are supported and guided; C the fixed head-stock, carrying the spindle upon which the cone-pulleys C' are secured. The blank taps to be threaded are secured and centred between the centering points $b\,b'$, the latter one of which is adjustable in its movable head-block B. The cutter or threading tool $c$ is firmly secured in the pillar $c'$ of the adjustable tool-rest D, which is supported upon a vibrating plate, D', and kept in place thereon by means of side flanges, and also by means of the tenon-guides $d\,d$. The adjusting screw $d'$, which is tapped through a stud on the bottom of the plate D, and passed loosely through a lug projecting up from the front end of plate D', is used for moving rest D in a direction with its length, so as to adjust the point of the tool $c$ nearer to or further from the centre of the tap, as may be required. The adjusting screw $e$, which is tapped perpendicularly through the rear end of the tool-rest D, and supported upon the top of plate D', as shown in figs. 3 and 7, is used for raising and depressing the point of the threading tool. One end of plate D' is supported upon the front end of a horizontal transverse slide, E, by means of pivot bearings $f\,f$, and the other or rear end of this plate D' is supported upon a longitudinal pattern, F, by means of a small anti-friction roller, $g$, as shown in figs 1, 3, and 7. The front end of the slide E is grooved over the front tenon-guide of the bed A', and the rear end of this slide rests upon the rear tenon-guides of this bed, as shown in fig. 7. The slide E, with its adjustable plates, may be moved upon the bed A' in a direction with the length thereof by means of a rack and pinion, the latter receiving motion from the spindle, on which are the cone-pulleys C', by means of gear-wheels, so arranged that the movement of said slide can be stopped and started at pleasure. The drawings do not illustrate any means for moving the slide E, as various well-known means may be adopted for this purpose. The pattern F is a bar of metal having four or more flat sides, according to the number of grooves or rows of cutting threads required on the tap; this pattern is supported at its ends in bearings $h\,h$, which project up perpendicularly from a longitudinal bar, H. This bar H is pivoted at one end to the upper end of a vertically adjustable post, I, which passes freely through a bracket projecting from the bed A'. The opposite end of bar H passes between guides on the upper end of the adjustable post I', and is supported by an adjusting screw, J, which is tapped through a projecting lip of said guides, as shown in figs. 1 and 6. The lower ends of the two posts I I' are pivoted to the transverse arms of a treadle, K, so that the attendant, while standing in front of the machine, can raise or depress the pattern at pleasure. The screw J is used for adjusting one end of the bar H so as to give the pattern F any desired inclination. Upon the pattern F is a belt-wheel, s, over which a belt, t, passes, that receives its movements from a belt-wheel, s', on the lathe spindle. The object of adjusting one end of the pattern by means of screw J is for cutting taps of any desired degree of taper. The elevations and depressions upon the pattern F produce, by the vibration of the tool-rest, corresponding elevations and depressions upon the tap P, as indicated in fig. 7, so that when the tap is grooved longitudinally, as shown in figs. 4 and 5, the cutting points of the threads will be more prominent than the heel points thereof, as clearly indicated by fig. 4. The spindle communicates a rotary motion to the pattern F, through the medium of the belt t, when the tool c is cutting or in a position for cutting, and when the tool is thrown up by depressing the front end of treadle K far enough, the belt t will be loosened and the motion of the pattern stopped.

Having described our invention, what we claim as new, and desire to secure by Letters Patent, is—

1. The vertically adjustable tool-rest D, vibrating plate D', and sliding support E, in combination with rotary centering points b b', substantially as and for the purposes described.

2. The application of the rotary pattern F to an adjustable bar, H, which is applied to a treadle, K, substantially as and for the purposes described.

WM. HOLROYD,
JAMES HOLROYD.

Witnesses:
CHAS. H. STEWART.
JOHN EDWARDS.